United States Patent Office 2,864,781
Patented Dec. 16, 1958

2,864,781

SALTS OF NEW HARDENABLE, BASIC, TERNARY CONDENSATION PRODUCTS

Otto Albrecht, Neuewelt, near Basel, and Armin Hiestand, Basel, Switzerland, assignors to Ciba Limited, Basel, Switzerland, a Swiss firm No Drawing. Application January 7, 1957
Serial No. 632,636

5 Claims. (Cl. 260—21)

This is a continuation in part of U. S. Patent application Serial No. 304,442, filed August 14, 1952, now U. S. Patent No. 2,783,231.

The present invention is based on the observation that water-soluble salts, including quaternary ammonium salts of hardenable, basic ternary condensation products are obtained when there are heated together (a) A member selected from the group consisting of methylol compounds of amino-1:3:5-triazines and ethers of said methylol compounds with low-molecular aliphatic alcohols having at most 4 C-atoms, (b) An aliphatic compound which contains a carbon chain of at least 7 C-atoms selected from the group consisting of Mono-carboxylic acids,
  Mono-carboxylic acid-N-methylolamides and
  N-methylol-urethanes, and (c) A low-molecular tertiary amine which contains a reactive hydrogen atom attached to oxygen, and the resulting basic products are then converted into water-soluble salts, including quarternary ammonium salts.

The process can be carried out in such a manner that first the compounds specified under (a) are condensed with the compounds as specified under (b) and the condensation product thus obtained reacted with the compounds as specified under (c), or that first the components specified under (a) and (c) are combined and the product obtained reacted with the compounds specified under (b), or further that first the compounds specified under (b) and (c) are condensed together and the condensation product thereupon reacted with the compounds as specified under (a). Finally the possibility is also provided of reacting all three components together simultaneously.

As methylol compounds of amino-1:3:5-triazines which may be used as reaction components corresponding to (a) there are primarily concerned the reaction products of formaldehyde with 2:4:6-triamino-1:3:5-triazine, usually known as melamine. Such condensation products can contain from 1 to 6 methylol groups and they usually constitute mixtures of different compounds. Furthermore, methylol compounds are concerned of such derivatives of melamine as still contain at least one amino group, for example methylol compounds of melam, melem, ammeline, ammelide or of halogen substituted amino-1:3:5-triazines, such as 2-chloro-4:6-diamino-1:3:5-triazine; moreover methylol compounds of guanamines, as for example of benzoguanamine, acetoguanamine or formoguanamine.

The ethers of the methylolamino-1:3:5-triazines with low molecular alcohols, which are applicable, can be derived from the compounds just mentioned on the one hand and from aliphatic alcohols having at most 4 C-atoms on the other hand, for example from methyl alcohol, butyl alcohol or allylalcohol. There may be mentioned, for example, the methyl ethers of methylol-melamines with 4 to 6 methylol groups in which 2 to 6 methylol groups are etherified. Such ethers can be obtained, for example, by heating of the methylol melamines with the alcohols in the presence of small quantities of mineral acids in the conventional manner.

The aliphatic compounds which contain a carbon chain of at least 7 C-atoms and which can be used as reaction components corresponding to (b) are mono-carboxylic acid, mono-carboxylic acid-N-methylolamides and N-methylol urethanes. Among the mono-carboxylic acids having a carbon chain of at least 7 C-atoms there may be mentioned, for example, capric, lauric, myristic, palmitic, oleic, stearic, behenic, ricinoleic and montanic acids and similar acids such as the mixtures of acids derived from vegetable or animal fats and oils, for instance coconut oil or palm kernel oil.

The mono-carboxylic acid N-methylolamides which can be used for the present process may be the N-methylolamides of the aforesaid mono-carboxylic acids; but the methylol derivatives of any other aliphatic mono-carboxylic acid amide having a carbon chain of at least 7 C-atoms may be employed for this purpose.

Among the aliphatic N-methylol-urethanes which contain a carbon chain of at least 7 C-atoms and which can also be used as reaction components (b) there may be mentioned N-methylolurethanes such, for example, as N-methylol-dodecylurethane, N-methylol-heptadecyl-urethane and N-methylol-octadecylurethane.

Among the specified compounds which can be employed as reaction components corresponding to (b) preferably such are used as contain a carbon chain of 16–18 C-atoms, for example, stearic acid, stearic acid-N-methylolamide and N-methylol-octadecylurethane.

The low-molecular tertiary amines which contain a reactive hydrogen atom attached to oxygen and which are to be used as components corresponding to (c) may belong to the heterocyclic or preferably to the aliphatic series. There may be mentioned low-molecular mono-tertiary alkanolamines such, for example, as $\beta$-oxyethyl-morpholine, methyl-diethanolamine, ethyl-diethanolamine, dimethyl-ethanolamine, diethyl-ethanolamine, di-isopropyl-ethanolamine, tri-(iso)-propanolamine and especially triethanolamine.

Instead of the application of individual compounds which are set forth as reaction components under (a), (b) and (c) for the present process, obviously mixtures of several of such compounds can also be used.

The manufacture of the new ternary condensation products takes place, in part, by the application of conventional processes, namely those which are known for the synthesis of the binary intermediate products. The production of condensation products from the components (a) and (b) may be illustrated by the reaction of methylolamino-1:3:5-triazines, or their ethers derived from low molecular alcohols, and N-methylolamides of mono-carboxylic acids having a carbon chain of at least 7 C-atoms. The starting materials can, for example, be heated to 50–100° C. in the presence of condensing agents such as boric acid, in which operation it is advantageous to remove the volatile hydroxyl compound (water or low molecular alcohols), produced in the reaction, from the reaction mixture by the application of reduced pressure. If in this reaction amino-1:3:5-triazine derivatives with free methylol groups are used as starting materials, it may be of advantage to have present in the reaction an auxiliary solvent, such as benzene or toluene, which renders it possible to remove the water of reaction continuously from the reaction mixture in the form of an azeotropic mixture. The proceeding can, for example, be such that the reaction is carried out at the boiling point of the auxiliary solvent and the distillate condensing in the reflux condenser, prior to return to the reaction vessel, is passed through a water separator which retains the water which has been split off. In a similar manner, instead of the N-methylolamides, the reaction can be carried out with the mono-carboxylic acids and N-methylol-urethanes which are concerned as reaction components corresponding to (b).

The reaction of intermediate products thus produced with the reaction component (c), that is to say the low-molecular tertiary amines defined above likewise takes place with advantage at elevated temperatures, preferably at temperatures above 100° C., for example at 120–150°. The reacting compounds can simply be fused together or reacted in the presence of an inert organic solvent. It may be of advantage to carry out the reaction under reduced pressure, whereby the easily volatile products produced, such as water and low molecular alcohols, can be removed from the reaction mixture.

The operations are similar when first the reaction components (a) and (c) are reacted together and the intermediate product produced is condensed with the component (b), or when first a condensation product is produced from the compounds corresponding to (b) and (c) and this is further condensed with component (a), or when all three components are reacted together simultaneously.

The molecular ratio between the components which are used is primarily dependent upon the number of the methylol or methylol ether groups in the component (a). Advantageously for one mol of a compound corresponding to (a) 1–2 mol of a compound corresponding to (b) and 1 mol of a compound corresponding to (c) are used for the reaction.

The new products obtainable by the reaction sequences above set forth constitute wax-like substances which as such are insoluble in water but in the form of salts are water-soluble.

The conversion of the free bases into the water-soluble salts, including quaternary ammonium salts which follows the condensation, is conducted by per se conventional methods. For the salt formation, inorganic acids such, for example, as hydrochloric acid, sulfuric acid and phosphoric acids, or organic acids can be used. There are employed advantageously low-molecular carboxylic acids such as formic acid, propionic acid, tartaric acid, lactic acid, oxalic acid, and especially acetic acid. For the conversion of the basic ternary condensation products into quaternary ammonium salts dimethyl-sulfate or benzyl chloride is suitable, for example. Other quaternizing agents, such as epichlorhydrine and monochloroacetamide, may be used too.

The water-soluble salts obtainable according to the present invention, when prepared from suitable starting materials, can be used, among other purposes, as auxiliary substances, for example in the textile, leather and paper industries. They can be applied as agents for rendering materials water-repellent and also as agents which reduce creasing or shrinking during washing and especially as softening agents. Upon wool interesting finishing effects can be attained with suitable products obtainable according to the invention, especially a considerably increased resistance to shrinkage, combined with an agreeable soft handle.

The application of the products obtainable according to the present process can be carried out in such a manner that the materials to be improved, preferably textiles, are treated with solutions, advantageously aqueous solutions of salts of the ternary condensation products, and if desired are heated to elevated temperatures.

For the finishing of wool, the material can be treated, for example, with a 5–10 percent aqueous solution of a salt of a product of the process, dried at low temperature and then heated for some time, for example 2 hours, to 80–90° C. In this manner, with products which contain an aliphatic radical with about 16–18 C-atoms, especially valuable finishes are obtained.

For the finishing of cellulosic materials, such as cotton or artificial silk from regenerated cellulose, the materials, impregnated with aqueous solutions of salts of suitable products of the process, advantageously in the presence of excess of acid such as formic acid, after pressing or squeezing out, can, without intermediate drying, be heated to elevated temperature, for example to 100–150° C. In this method of treatment, products with an aliphatic radical of about 16–18 C-atoms impart to the treated material a water-repellent finish which is to a far-reaching extent resistant to washing. To the baths intended for the production of a water-repellent finish there may be added water-soluble aluminium salts, for example aluminium triformate, or also zirconium compounds, for example zirconium salts or sols of hydrated zirconium dioxide, or paraffin wax dispersions. In a similar manner a soft handle can also be imparted to the textiles. For the preparation of a water-repellent finish in general 10–80 grams per liter of the condensation products are added to the foularding bath, whereas for imparting a soft handle much smaller quantities, for example 0.1 percent of the weight of the fabric, are sufficient.

The products of the present invention can be used alone or, as to some extent already indicated, together with other substances, such as salts, especially of weak acids, for example sodium acetate or aluminium acetate, or also together with hydrocarbons, such as paraffin wax, solvents, methylolamides, protective colloids, finishing or matting agents, such as methylolureas, weighting or softening agents and the like, these additions being, however, selected in such a manner that they cause no precipitation of the products of this invention from the solutions of their salts.

The following examples illustrate the invention, the parts being by weight unless otherwise stated and the relation between part by weight and part by volume being the same as that between the kilogram and the liter:

*Example 1*

A mixture of 15 parts of triethanolamine and 90 parts of a fused ester from methylated methylolmelamine and stearic acid, the preparation of which is described below, is heated with stirring, under reduced pressure (10–20 mm.) to 115–120° C. until a test portion removed from the reaction vessel is soluble in dilute hot acetic acid. Thereupon the melt is stirred at 70–80° C. with 7 parts of glacial acetic acid. A yellowish, wax-like and water-soluble product is obtained which on stirring with about double the quantity of hot water assumes a paste-like consistency.

The ester from the methylated methylol melamine and the stearic acid is prepared in an analogous manner to the esters described in Swiss patent specification No. 251,642. In this process, however, there is used as starting material a methylated methylol melamine which only differs from the methylol melamine methyl ether described in the last paragraph of the example of the said specification by the fact that the syrup which is obtained after condensation, filtration and concentration to about 99 percent, is not taken up in benzene but filtered hot for the removal of the residual salt.

1 part of this methylol melamine methyl ether is heated with about 1.3 parts of stearic acid under a pressure of 10–20 mm. to 180–200° C. until the acid number of the product has fallen to 5–8.

When 102 parts of the basic condensation product, obtainable according to the first paragraph of this example and not neutralized with acetic acid, are stirred at 60–70° C. with 8.9 parts of propionic acid, a wax-like product is obtained which is soluble in water.

Example 2

A mixture of 15 parts of triethanolamine and 90 parts of a fused condensation product from methylated methylol melamine and N-methylol stearic acid amide, the preparation of which is described below is heated with stirring at a reduced pressure of 10-20 mm. for one hour to 115-120° C. The basic condensation product thus obtained, which dissolves in hot dilute acetic acid, is treated at 90° C. with 7 parts of glacial acetic acid and the mixture well stirred for one hour. After allowing to cool, a wax-like, water-soluble mass is obtained.

When 102 parts of the aforesaid basic condensation produced are stirred at 70° C. with 120 parts of glycolic acid of 70 percent strength and 186 parts of water of 70° C., a paste is obtained, which can be diluted with water.

The condensation product from the methylated methylol melamine and the N-methylol stearic acid amide, is prepared by heating a mixture of 60 parts of N-methylol stearic acid amide and 39 parts of the methylol melamine methyl ether described in Example 1, to 115-120° C. for 1-2 hours at a pressure of 10-20 mm. A hard wax-like mass is obtained, giving a clear melt with paraffin wax but being itself unmelted in a boiling water bath.

Example 3

15 parts of triethanolamine and 39 parts of the methylol melamine methyl ether mentioned in Example 1, are heated under a pressure of 10-20 mm. for one hour to 115-120° C. Thereupon, at 115-120° C. with stirring, 60 parts of N-methylol-stearic acid amide are introduced in small portions. After the whole is fused together, the pressure in the reaction vessel is reduced to 10-20 mm. and the melt intensively stirred for one to two hours at 115-120°. Thereupon 7 parts of glacial acetic acid are added at 90-95° C. and the melt stirred for one hour at 80-90° C. under atmospheric pressure. The condensation product obtained possesses properties similar to that produced according to Example 2.

Example 4

15 parts of triethanolamine and 90 parts of a condensation product from N-methylol stearic acid amide and an etherification product from hexamethylol melamine and methanol, which product contains about 3 methoxy groups and is produced according to Example 1 of Swiss patent specification No. 268,532, are fused together and, when a melt is produced, heated with stirring at a pressure of 10-15 mm. for 3 hours to 115-120° C. A viscous melt is obtained which, after complete solidification, can be pulverised and which is soluble to a clear solution in hot dilute acetic acid.

The basic condensation product forms opalescent solutions with hot aqueous solutions of oxalic acid, tartaric acid, phosphoric acid and sodium dihydrogen phosphate.

Example 5

27 parts of commercial stearic acid and 36 parts of the highly methylated methylol melamine specified in Example 1 are fused in a reaction vessel and heated under a reduced pressure, initially of 20-50 mm. depending on the degree of foaming, in 2 hours to 190-200° C. After stirring for one hour at this temperature, the whole is allowed to cool to 120° C. and 30 parts of N-methylol stearic acid amide are introduced. After melting of the methylol amide the whole is intensively stirred at 115-120° C. for one hour at a reduced pressure of 10-20 mm. The product, which solidifies on cooling to a wax-like mass, melts in the hot water bath and forms a clear melt in paraffin wax. The condensation product obtained in this manner can be condensed in an analogous manner to that described in Example 1 with, for example, 15 parts of triethanolamine and after conversion of the product into the acetic acid salt a mass is obtained which is soluble in hot water.

Example 6

By proceeding exactly as described in Example 2, with the exception that instead of the 60 parts of N-methylol-stearic acid amide 68 parts of N-methylol octadecylurethane, prepared from octadecylurethane and formaldehyde by conventional methods, are used, a soft and wax-like mass which is easily soluble in hot water is obtained.

Example 7

27 parts of commercial stearic acid and 15 parts of triethanolamine are heated in a current of nitrogen at 180-200° C. until a test portion of the melt forms a clear solution in hot dilute acetic acid. Thereupon 36 parts of the methylol melamine methyl ether specified in Example 1 are added at 120° C. and the reaction mixture stirred for 2 hours under a pressure of 30 mm. at 115-120° C. 30 parts of N-methylol stearic acid amide are then further added and the melt maintained at 115-120° C. under a reduced pressure of 30 mm. until a test portion is entirely soluble in hot dilute acetic acid, which is usually the case after an hour. The melt is now allowed to cool to 90° C. and 6.5 parts of glacial acetic acid added. After thorough stirring for one hour wax-like mass is obtained which is soluble in hot water.

Example 8

30 parts of N-methylol stearic acid amide, 0.5 part of dry, powdered sodium carbonate and 15 parts of triethanolamine are fused together under a reduced pressure of 30 mm. and heated for 2 hours to 110° C. The melt is then soluble in dilute acetic acid. It is mixed with 36 parts of the methylol melamine methyl ether specified in Example 1 and the mixture again heated under reduced pressure to 120° C. After 2 hours a further 30 parts of N-methylol stearic acid amide are added and the stirring continued until a test portion is soluble in dilute acetic acid. When this is the case, the whole is allowed to cool to 90° C. and 6 parts of glacial acetic acid added. After a further hour's stirring at atmospheric pressure, the melt is allowed to solidify to a wax-like mass which is soluble in hot water.

When the basic condensation product, obtained according to the preceding paragraph but not neutralized with acetic acid, is stirred at 70-80° C. with 13 parts of freshly distilled dimethylsulfate, a wax-like mass is obtained which is soluble in warm water of acid or alkaline reaction.

When the basic condensation product, obtained according to the first paragraph of this example but not neutralized with acetic acid, is stirred for 4-6 hours with 13 parts of benzyl chloride at 85-105° C., there is obtained a product which is soluble in hot water.

The quaternary ammonium salts described above can be used as softening agents. The softening effect obtained therewith on viscose rayon is fast to washing when the material treated in the presence of an acid catalyst is subjected, after drying, to a heat treatment at 145° C. for 5 minutes.

Example 9

14 parts of N-hydroxyethyl-morpholine and 90 parts of the ester from methylated methylol melamine and stearic acid mentioned in the second paragraph of Example 1 are fused together and the melt heated to 120° C. while stirring under a pressure of 20-30 mm. After 3-4 hours a test portion is soluble in warm dilute acetic acid. The melt is cooled to 60° C. and 13 parts of freshly distilled neutral dimethyl sulfate added dropwise, after which the product is stirred for another hour at 50-60° C. On cooling, the viscous melt solidifies to form a hard, wax-like mass of pale yellow color which is soluble in warm water.

Example 10

56 parts of cocoanut oil fatty acid and 55 parts of the highly methylated methylol melamine mentioned in Example 1 are fused together in a flask and heated to 195–200° C. in the course of 2 hours under in initial pressure of 10–50 mm., depending on the degree of foaming. The melt is stirred for two hours at this temperature and then allowed to cool to 120° C., and 23.5 parts of triethanolamine added. The reaction mass is then heated to 115–120° C. for an hour and a half at 10–15 mm. pressure. When the melt is stirred with 9 parts of glacial acetic acid at 80° C. there is obtained a red-brown, clear oil which is soluble in water.

*Example 11*

Cotton gabardine is treated on the foulard up to an increase in weight of about 100 percent, in an aqueous bath at a temperature of 60–65° C. which contains 9 parts of water, 0.1 part of ammonium chloride, 0.1 part of 85 percent formic acid and 0.8 part of the emulsion described below. The fabric is thereupon dried at 80° C. and subsequently after-treated for 5 minutes at 120–150° C. Both the unwashed and the washed fabric shows good water-repellent properties.

The emulsion used in this example can be produced as follows:

40 parts of the product obtainable according to Example 1 and 40 parts of paraffin wax are melted together at 90–95° C. Emulsification with brisk stirring is then carried out with the addition of 80 parts of water at 60–70° C. The emulsion is continuously stirred until the mass reaches room temperature.

*Example 12*

An operation is conducted in an analogous manner to that described in Example 11 but using a bath which contains 9 parts of water, 0.1 part of ammonium chloride, 0.1 part of 85 percent formic acid and 0.1–0.8 part of one of the condensation products obtainable according to Examples 1, 2, 3, 5, or 6. In this manner a cotton gabardine is obtained which possesses a finish of good water-repellent properties which are still retained after a boiling wash with 5 grams per liter of soap and 2 grams per liter of sodium carbonate.

*Example 13*

Viscose artificial silk is treated for 30 minutes at 20–30° C. with a bath ratio of 1:30 in a bath which contains 0.1–1 percent of one of the condensation products obtainable according to Examples 1–9 and 1–4 percent of ammonium chloride (both calculated upon the weight of yarn). Drying is then carried out at 80° C. and hardening at a somewhat higher temperature. A viscose artificial silk is obtained with a very good, soft handle which still remains after washing (¼ hour at 90° C. in a bath which contains 2 grams per liter of the disodium salt of 2-heptadecyl-N-benzylbenzimidazole disulfonic acid and 1 gram per liter of 25 percent ammonia).

*Example 14*

A mixture of 20 parts of tri-isopropanolamine and 90 parts of the ester from methylated methylolmelamine and stearic acid, the preparation of which is described in Example 1, is heated with stirring under reduced pressure (10–20 mm.) to 115–120° C. until a test portion removed from the reaction vessel is soluble in dilute hot acetic acid. Thereupon the melt is stirred at 60–70° C. with 7 parts of glacial acetic acid. A yellow-brown, wax-like and water-soluble product is obtained. The product gives foaming stable solutions in hot diluted acetic acid.

*Example 15*

90 parts of the ester from methylated methylolmelamine and stearic acid, the preparation of which is described in Example 1, and 9 parts of dimethyl-ethanolamine are heated for two hours to 135–140° C., whereupon a test portion removed from the reaction mixture is soluble in dilute hot acetic acid giving a foaming solution on shaking. The basic condensation product thus obtained is then stirred at 60° C. with 7 parts of glacial acetic acid. After allowing to cool, a wax-like, water-soluble and weakly yellow colored mass is obtained.

*Example 16*

90 parts of the condensation product from methylated methylolmelamine and N-methylol stearic acid amide, the preparation of which is described in the last paragraph of Example 2, and 12 parts of diethyl-ethanolamine are heated for two hours to 135–140° C. After that time a test portion removed from the reaction vessel is soluble in dilute hot acetic acid. The basic condensation product is then stirred at 60° C. with 7 parts of glacial acetic acid. After allowing to cool a wax-like mass is obtained which gives foaming solutions in hot water.

*Example 17*

The process is conducted as described in Example 8 but the 36 parts of methylolmelamine methyl ether used therein are replaced by 50 parts of a hexamethylolmelamine allyl ether having 4–6 allyl ether groups or by 58 parts of a hexamethylolmelamine butyl ether having 4–6 butyl ether groups. In both cases wax-like products are obtained, the solutions of which foam on shaking.

What is claimed is:

1. A water-soluble salt of a hardenable basic ternary condensation product which has been obtained by heating together first (a) an ether of a methylol-melamine with a low-molecular aliphatic alcohol having at most 4 C-atoms, with (c) triethanolamine, and then heating the condensation product so obtained with (b) a member selected from the group consisting of monocarboxylic acids of the formula

R—COOH monocarboxylic acid-N-methylolamides of the formula

R—CO—NH—CH$_2$OH and N-methylol-urethanes of the formula

R—O—CO—NH—CH$_2$OH in which formulae R stands for an aliphatic hydrocarbon radical with 7 to 18 carbon atoms, and converting the basic product into the water-soluble salt.

2. A water-soluble salt of a hardenable basic ternary condensation product which has been obtained by heating together first (a) about 1 mol of a hexamethylolmelamine hexamethyl ether with (b) about 2 mols of stearic acid in vacuo to 180–200° C., and heating the ester thus obtained with (c) about 1 mol of triethanolamine in vacuo to 115–120° C. until the product is soluble in dilute acetic acid, and converting the base into the water-soluble salt with propionic acid.

3. A water-soluble salt of a hardenable basic ternary condensation product which has been obtained by heating together first (a) about 1 mol of a hexamethylolmelamine hexamethyl ether with (b) about 2 mols of N-methylol octadecylurethane in vacuo to 115–120° C. for 1–2 hours, and heating the ether thus obtained with (c) about 1 mol of triethanolamine in vacuo to 115–120° C. for one hour, and converting the base into the water-soluble salt with acetic acid.

4. A water-soluble quaternary ammonium salt of a hardenable basic ternary condensation product which has been obtained by heating together (b) 1 mol of stearic acid N-methylolamide with (c) 1 mol of triethanolamine at 110° C. for two hours in vacuo, heating the amide thus obtained with (a) 1 mol of a hexamethylolmelamine hexamethyl ether at 120° C. for two hours in vacuo and heating this condensation product with another mol of stearic acid N-methylolamide until the product is soluble in dilute acetic acid, and finally converting the base into the quaternary ammonium salt with 1 mol of dimethyl sulfate at 70–80° C. at ordinary pressure.

5. A water-soluble salt of a hardenable basic ternary condensation product which has been obtained by heating together first (a) about 1 mol of a hexamethylolmelamine hexamethyl ether with (b) about 2 mols of stearic acid in vacuo to 180–200° C., and heating the ester thus obtained with (c) about 1 mol of tri-isopropanolamine in vacuo to 115–120° C. until the product is soluble in dilute acetic acid, and converting the base into the water-soluble salt with acetic acid.

References Cited in the file of this patent

UNITED STATES PATENTS 2,783,231   Albrecht et al. _____ Feb. 26, 1957

UNITED STATES PATENT OFFICE

CERTIFICATE OF CORRECTION

Patent No. 2,864,781 December 16, 1958

Otto Albrecht et al.

It is hereby certified that error appears in the above numbered patent requiring correction and that the said Letters Patent should read as corrected below.

In the heading to the printed specification, between lines 8 and 9 thereof, insert -- Claims priority, application Switzerland August 31, 1951 --;

column 6, line 24, after "hour" insert -- a --; column 7, line 3, for "in initial" read -- an initial --.

Signed and sealed this 7th day of July 1959.

(SEAL)
Attest:

KARL H. AXLINE
Attesting Officer

ROBERT C. WATSON
Commissioner of Patents